United States Patent [19]

Zamkow

[11] 3,882,464

[45] May 6, 1975

[54] SIZE RATIO LABEL READING SYSTEM

[75] Inventor: Stanley F. Zamkow, North Abington, Mass.

[73] Assignee: Computer Identics Corporation, Westwood, Mass.

[22] Filed: Apr. 4, 1974

[21] Appl. No.: 457,796

[52] U.S. Cl. .................... 340/146.3 Z; 235/61.11 E

[51] Int. Cl. .............................................. G06k 9/18

[58] Field of Search ........ 340/146.3 Z; 235/61.11 E

[56] References Cited

UNITED STATES PATENTS

| | | | |
|---|---|---|---|
| 3,701,097 | 10/1972 | Wolff | 340/146.3 Z |
| 3,701,886 | 10/1972 | Jones | 340/146.3 Z |
| 3,758,752 | 9/1973 | Kapsambelis | 340/146.3 Z |
| 3,784,792 | 1/1974 | Dobras | 340/146.3 Z |
| 3,811,033 | 5/1974 | Herrin et al. | 340/146.3 Z |

*Primary Examiner*—Gareth D. Shaw
*Assistant Examiner*—Leo H. Boudreau
*Attorney, Agent, or Firm*—Joseph S. Iandiorio

[57] ABSTRACT

A label reading system for reading a label including a cell of information including segments having contrasting characteristics, at least one of the segments occurring in more than one width comprising: sensing means for reading a label and producing signals representative of the contrasting segments; means, responsive to the signals, for measuring the interval of each of the segments; means, responsive to the means for measuring, for combining the measurements of each of the segments to produce a first ratio of a function of the width of a first segment to a function of the width of a second segment and a second ratio of a function of the width of the second segment to a function of the width of the first, and for determining whether either of those ratios equals respective first and second reference ratios within a predetermined range; and means, responsive to the means for combining and determining, for indicating that one of the first or second reference ratios has been met.

2 Claims, 12 Drawing Figures

SIZE RATIO LABEL READING SYSTEM

FIELD OF INVENTION

This invention relates to a label reading system having an improved depth of field and more particularly to such a system for determining the relative widths of contrasting coded marks independent of the distance between the label and reading apparatus.

BACKGROUND OF INVENTION

In conventional reading systems in which the width or other dimension of a coded mark is important the depth of field problem has been met in a number of ways. In one approach a specific mark is used as a reference against which the size of the other marks is compared. However this requires relatively complex equipment to identify the reference mark and to carry out the comparison. Further, if the marks and reader are moved toward or away from each other after the reference mark is sensed error may result. In another approach, in which pairs of contrasting coded marks are viewed as a set, clock pulses increment a counter during the interval of one mark and then the counter is decremented by clock pulses during the interval of the contrasting mark. If the remainder in the counter is positive the first mark is bigger, if negative the second mark is bigger. With this technique when the decision is made that one of the marks is the larger and the other the smaller it is assumed that the two marks differ in size by the proper ratio but in fact the ratio may be any that satisfies the condition that the one is larger and the other smaller.

SUMMARY OF INVENTION

It is therefore an object of this invention to provide a label reading system having an improved depth of field and increased reliability.

It is a further object of this invention to provide such a label reading system which determines not only which of two contrasting marks is the larger and which the smaller but also whether the relative sizes of the two marks are in the proper ratio as well.

It is a further object of this invention to have available such a label reading system which is capable of determining whether the proper ratio exists within predetermined limits.

The invention results from the realization that increased depth of field, improved reliability and accuracy can be achieved by decoding the size of marks not only with respect to the relative sizes of contrasting marks but also as a function of the proper ratio of sizes of those marks.

The invention features a label reading system for reading a label including a cell of information having segments with contrasting characteristics; at least one of the segments occurs in more than one width. There are sensing means for reading a label and producing signals representative of the contrasting segments and means, responsive to the signals, for measuring the interval between those segments. Means responsive to the means for measuring, combine the measurements of each of the segments to produce a first ratio of the width of a first segment to the width of a second segment and a second ratio of the width of the second segment to the width of the first; these means also determine whether either of those ratios equals a respective first and second reference ratio within a predetermined range. Other means, responsive to the means for combining and determining, indicate whether one of the first or second reference ratios has been met.

DISCLOSURE OF PREFERRED EMBODIMENT

Other objects, features and advantages will occur from the following description of a preferred embodiment and the accompanying drawings, in which.

Figure 3:
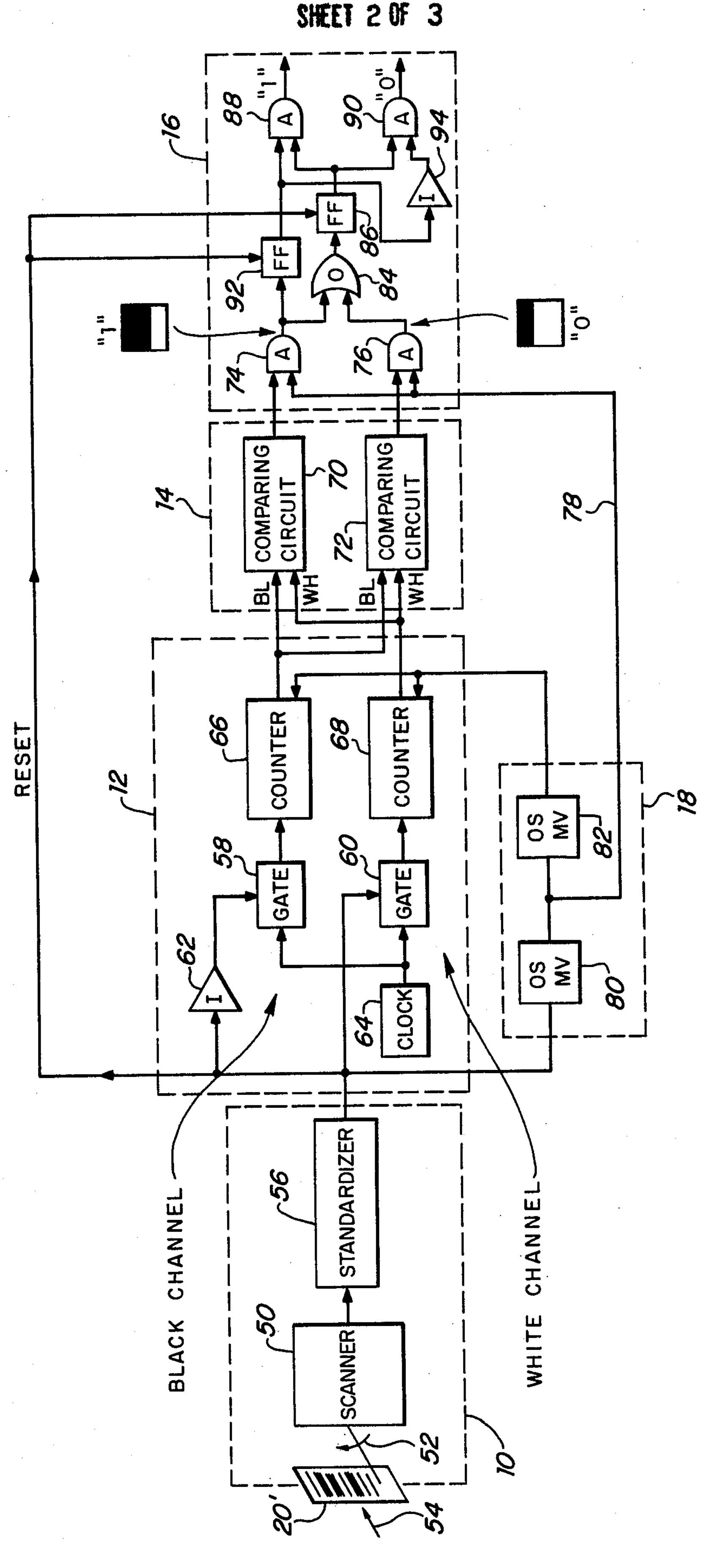
FIG. 3 is a more detailed, block diagram of the system of FIG. 1.
Figure 4:
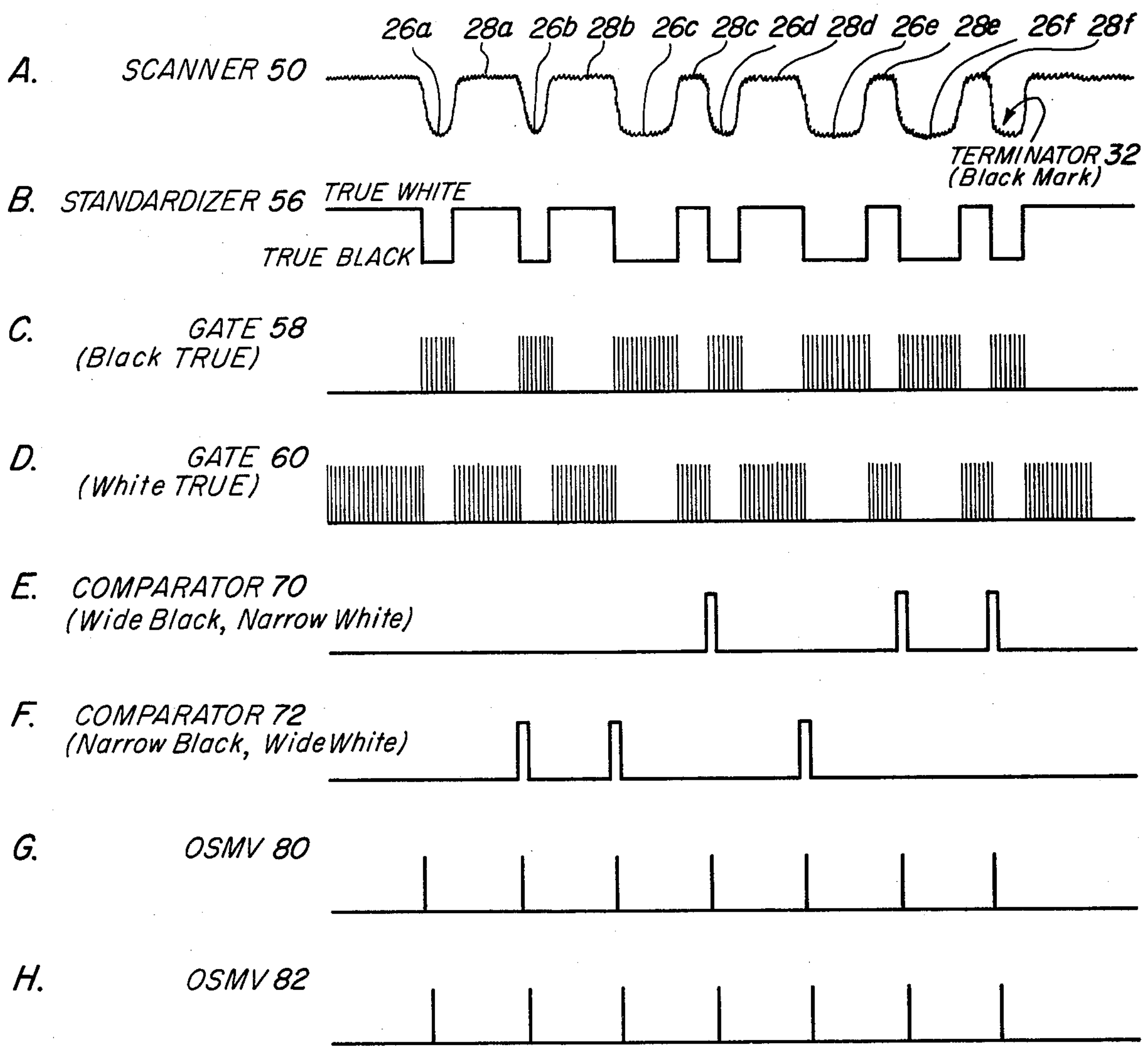
Figure 5:
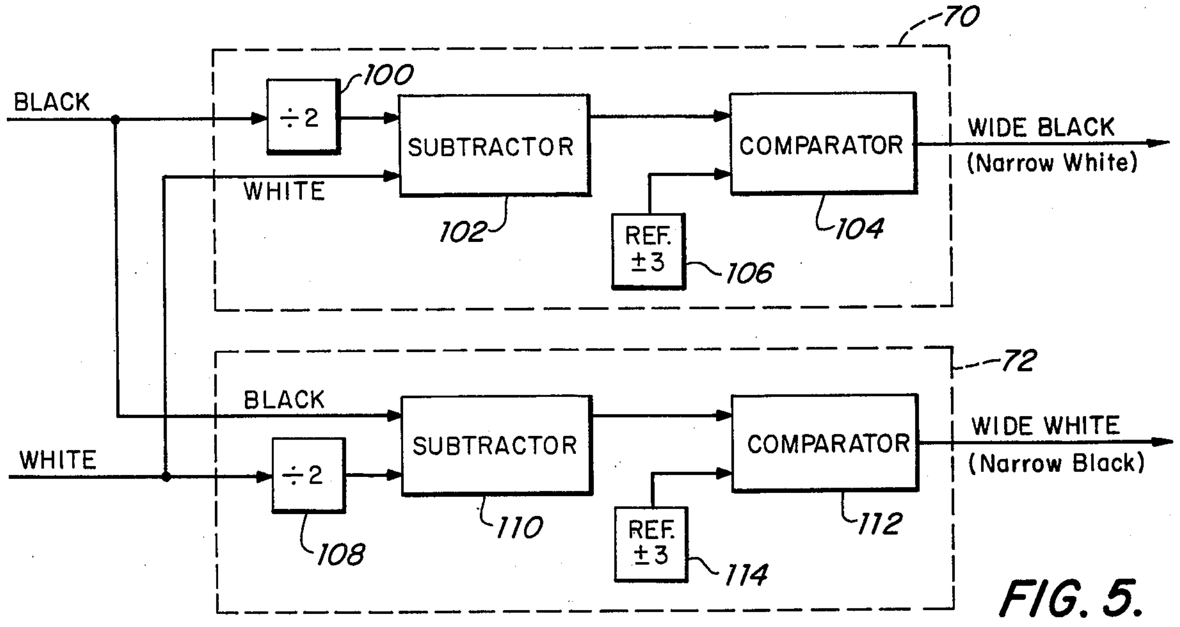

FIGS. 4A–H are timing diagrams showing various output signals as they occur in FIG. 3; and FIG. 5 is a more detailed diagram of the comparing circuits shown in FIG. 3.

Figure 1:
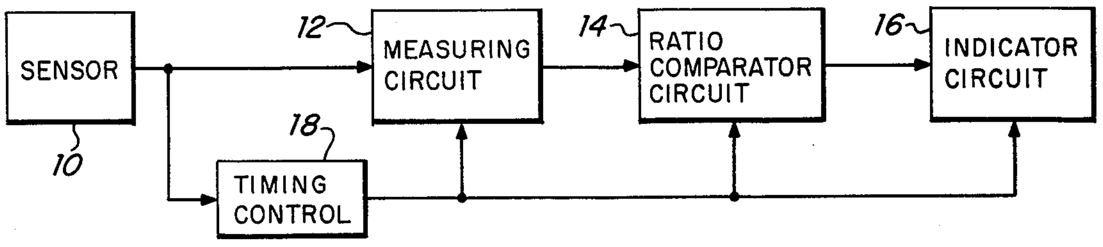
FIG. 1 is a simplified block diagram of a label reading system according to this invention.

There is shown in FIG. 1 a sensor 10 which may be any type of sensing means which is compatible with the form of the information on the label or object to be read. For example, if the information were magnetic markings, sensor 10 would include a magnetic reading head and if the information to be read were in the form of optical indicia then the sensor 10 would include an optical reading head. Information to be read by the system in FIG. 1 is typically composed of one or more cells of information each of which has at least two contrasting segments or marks; in an optical system the contrast may be achieved by providing each of the segments in the cell with optically distinguishable characteristics e.g. for a system which has two marks per cell the marks may be black or white or retroreflective or non-retroreflective. In a system in which there are two or more marks per cell, a number of different colors or reflective qualities could be used. For example, sensitivity to infra red, ultra violet, or other radiation may be used. Whatever the input, sensor 10 provides an output to measuring circuit 12 that measures each of the marks and provides ratio comparator circuit 14 with the measurement. Ratio comparator circuit 14 makes the determination as to whether the ratio of these measurements meets certain reference ratios. Indicator circuit 16, responsive to a determination by ratio comparator 14 that one of the ratio references has been met, provides an indication representing the significance of the marks which have been read. The timing control 18 supervises the transfer and processing of the information through the system.

Figure 2:
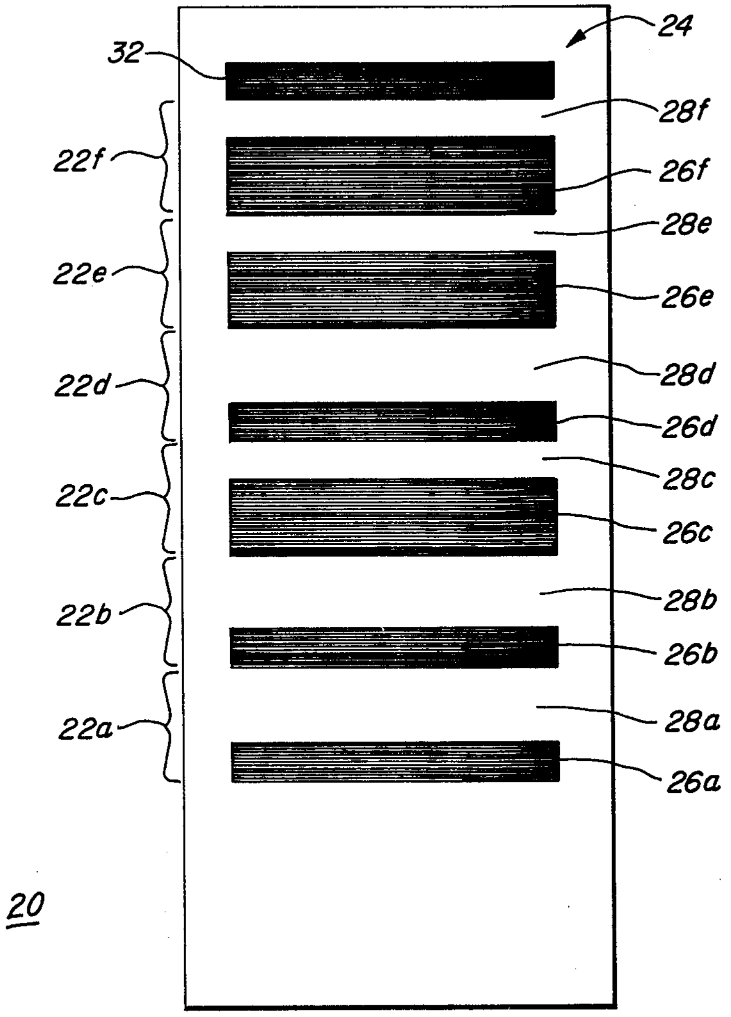
FIG. 2 is a diagram of a label that may be used with the label reading system of FIG. 1.

In one preferred embodiment the system of FIG. 1 may be used to read label 20, FIG. 2, which includes a number of cells of information 22*a*–22*f*. Each cell, as exemplified by cell 22*a*, includes a black mark 26*a* which contrasts with white background 24 and a white mark 28*a* which has the same characteristics as white background 24 contrasting with black mark 26*a*. The black marks 26*a* through 26*f* may be either narrow, as exemplified by marks 26*a*, *b* and *d*, or wide as indicated by marks 26*c*, *e* and *f*. Similarly white marks 28*a*–28*f* may be either wide, as exemplified by marks 28*a*, *b* and *d*, or narrow as exemplified by marks 28*c*, *e* and *f*. Label 20 is constructed so that wide marks are twice the width of narrow marks: a cell having a wide white mark and a narrow black mark would provide a white to black ratio of 2 to 1 and a black to white ratio of 1 to 2. Conversely a cell having a wide black mark and a narrow white mark would provide a white to black ratio of 1 to 2 and a black to white ratio of 2 to 1. Label 20 may be read by scanning from the bottom upward across the marks. A black termination mark 32 is provided to positively terminate cell 22*f*.

In FIG. 3, where there is shown a label reading system similar to that shown in FIG. 1 designed to read the label shown in FIG. 2, like parts have been given like numbers and similar parts like numbers primed with respect to FIGS. 1 and 2. Sensor 10 includes a scanner 50 which scans vertically, as indicated by arrow 52, from bottom to top across label 20' which moves horizontally, as indicated by arrow 54, past scanner 50. The output of scanner 50 is submitted to standardizer circuit 56 which shapes and makes uniform the pulses from scanner 50 using conventional circuitry. The output from standardizer 56 is used to control gates 58 and 60 in measuring circuit 12. The output from standardizer 56 is sent directly to gate 60 and through inverter 62 to gate 58. Clock pulses from clock 64 are passed to counters 66 and 68 by gates 58 and 60. The output of counters 66 and 68 is fed to comparing circuits 70 and 72 in ratio comparator circuit 14.

The output of comparing circuits 70 and 72 are fed to AND gates 74 and 76, respectively, in indicator circuit 16. AND gates 74 and 76 provide an output upon the conjunction of an input from their respective comparing circuits 70 and 72 and an enabling signal on line 78 from timing control 18 which includes one shot multivibrator 80 and one shot multivibrator 82. One shot multivibrator 80 provides an output to one shot multivibrator 82 on line 78 upon receiving the trailing edge of a white signal; one shot multivibrator 82 triggers on the trailing edge of the signal from one shot multivibrator 80 to provide a pulse to counters 66 and 68 which resets counter 68 to zero, and presets counter 66 to a number equal to the number of counts that would have occured during the total time from the beginning of the black pulse to the end of the reset pulse; otherwise these counts would be lost, impairing accuracy by destroying the ratio. In correspondence with the black and white contrasting construction of label 20, FIG. 2, the system of FIG. 3 is comprised of two channels — a black channel and a white channel. The black channel includes gate 58, counter 66, comparing circuit 70 and AND gate 74; the white channel includes gate 60, counter 68, comparing circuit 72 and AND gate 76. A true output from AND gate 74 in the black channel indicates that the wide black stripe is twice the width of the white stripe. A similar output from AND gate 76 in the white channel indicates that the white mark is twice the width of the black mark. As shown in FIG. 3, for purposes of coding information on label 20, a wide black mark in conjunction with a narrow white mark may be considered a binary 1 and is recognized when the output of AND gate 74 is true and a wide white mark in conjunction with a narrow black mark is considered a binary 0 and is recognized as present when AND gate 76 provides a true output.

Upon the attainment of a true state by either AND gate 74 or AND gate 76 OR gate 84 provides a signal to set flip-flop 86 and enable AND gates 88 and 90. If it were AND gate 74 that provided the true output flip-flop 92 is set and AND gate 88 is caused to indicate that a binary 1 i.e. a wide black mark and a narrow white mark have been recognized. Conversely, if the output of AND gate 74 is not true, flip-flop 92 provides no output and inverter 94 then provides the second input to AND gate 90 so that AND gate 90 is actuated to indicate that a binary 0 i.e. a wide white mark in conjunction with a narrow black mark has been recognized. The absence of a true output at AND gate 88 represents necessarily that there is a true output at AND gate 90 since flip-flop 86 has been set to enable AND gates 88 and 90.

In operation flip-flops 86 and 92 must be reset prior to each output pulse from one shot multivibrator 80 so that the flip-flops are cleared of old information when the compare pulse of one shot multivibrator 80 enters new data. One available signal which may be used is the white data true signal at the output of standardizer 56; it always occurs prior to the output from one shot multivibrator 80 and not before there is a reasonable amount of time to transfer the data to the external logic.

In operation scanner 50, FIG. 3, when reading label 20, FIG. 2, provides the output shown in FIG. 4A; the negative going portions of FIG. 4A represent black marks, the positive going white marks. Standardizer 56 accepts the output of scanner 50 and produces, at its output, the square wave shown in FIG. 4B. The black gate 58 passes pulses from clock 64 to counter 66 during the interval of the black marks and produces the wave form as shown in FIG. 4C; white gate 60 passes clock pulses to counter 68 during the interval of white marks to produce the waveform shown in FIG. 4D. The count representing the black marks from counter 66 is fed to both comparing circuits 70 and 72 and the count in counter 68 representing the white marks is also fed to both comparing circuits 70 and 72. Comparing circuit 70 provides an output whenever it recognizes that the ratio of the width of the black mark to the width of the white mark is 2 to 1, to produce the waveform as shown in FIG. 4E. Comparing circuit 72 produces an output when the width of the white mark is twice the width of the black mark to produce the waveform as shown in FIG. 4F. In the embodiment shown in FIG. 3 one and only one of comparing circuits 70 and 72 would provide an output to its respective AND gates 74 and 76 so that only one of those will provide a recognition indicating either that a binary 0 — wide white mark, narrow black mark, or a binary 1 — wide black mark, narrow white mark has been recognized. FIG. 4G illustrates the occurrence of the output signal from one shot multivibrator 80 which occurs at the trailing edge of each white signal and FIG. 4H indicates the output of one shot multivibrator 82 which occurs shortly after the output of one shot multivibrator 80 to reset counters 66 and 68; counters 66 and 68 are made ready for reading a successive cell immediately after a preceding cell has been read.

Comparing circuit 70 may include a divide-by-two circuit 100, FIG. 4, a subtractor 102, comparator 104, and a reference circuit 106. Similarly comparator 72 may include divider circuit 108, subtractor 110, comparator 112 and reference circuit 114.

The black count is divided by two in divider circuit 100 and then submitted with the white count to subtractor 102; the difference of the two counts is provided to one input of comparator 104. This signal representing the difference between one half the black count and the full white count is compared to a difference figure in comparator 104. The difference figure is derived from the reference circuit 106 and is illustratively indicated in FIG. 5 as being plus or minus three. Thus if the difference between one-half the black count and the full white count is no more than plus or minus three counts comparator 104 provides an output indicating that a combination of a wide black mark and narrow white mark i.e. a binary 1, has been recognized.

In a similar manner divider circuit 108 divides the white count by two and submits it to subtractor 110 which receives at its other input the full black count. The output of subtractor 110 representing the difference between half the white count and the full black count is submitted to comparator 112 and if it is within the range, plus or minus three, provided by reference circuit 114 comparator 112 provides an output indicating that a wide white mark and a narrow black mark has been read and recognized as a binary 0.

Other embodiments will occur to those skilled in the art and are within the following claims:

What is claimed is:

1. A reading system for reading encoded information and determining whether the ratio of the widths of a pair of segments is within acceptable limits, said encoded information presented in pairs of adjacent segments including a first segment having a first characteristic and a second segment having a second contrasting characteristic, said segments occurring in more than one width, comprising:

sensing means for reading said encoded information and producing a first segment signal representative of said first segment and a second segment signal representative of said second segment;

measuring means, responsive to said first and second segment signals, for providing first and second size signals representative of the widths of said first and second segments, respectively;

a first function generator, responsive to said first size signal, for producing a first function signal and a second function generator, responsive to said second size signal for producing a second function signal; and first determining means responsive to the difference between said first function signal and said second size signal for producing a first recognition signal representative of whether the ratio of the widths of said first and second segments is within a first predetermined range and second determining means, responsive to the difference between said second function signal and said first size signal for producing a second recognition signal representative of whether the ratio of the widths of said first and second segments is within a second predetermined range.

2. The system of claim 1 in which said first determining means includes:

first subtractor means, responsive to said first function signal and said second size signal for producing a first difference signal representative of the difference thereof; and first comparator means, responsive to said first difference signal and a first reference signal for providing said first recognition signal representing whether the ratio of widths of said first and second segments is within a first predetermined range;

and said second determining means includes second subtractor means responsive to said second function signal and said first size signal for providing a second difference signal representative of the difference thereof; and second comparator means, responsive to said second difference signal and a second reference signal for providing said second recognition signal representing whether the ratio of widths of said first and second segments is within a second predetermined range.

* * * * *